R. FOURCHY.
SPRING WHEEL.
APPLICATION FILED JUNE 30, 1913.
1,093,391.
Patented Apr. 14, 1914.
2 SHEETS—SHEET 1.
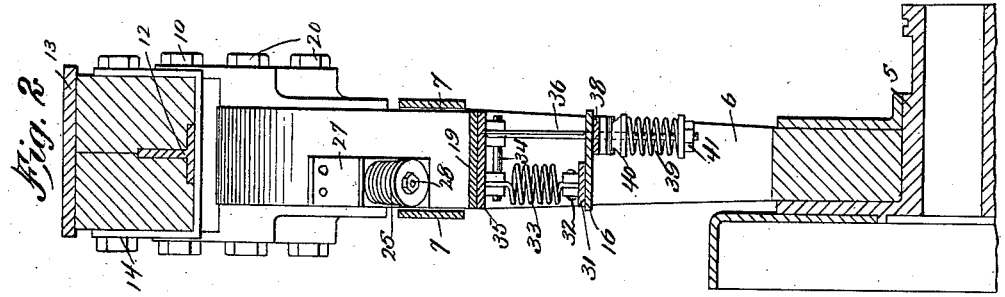
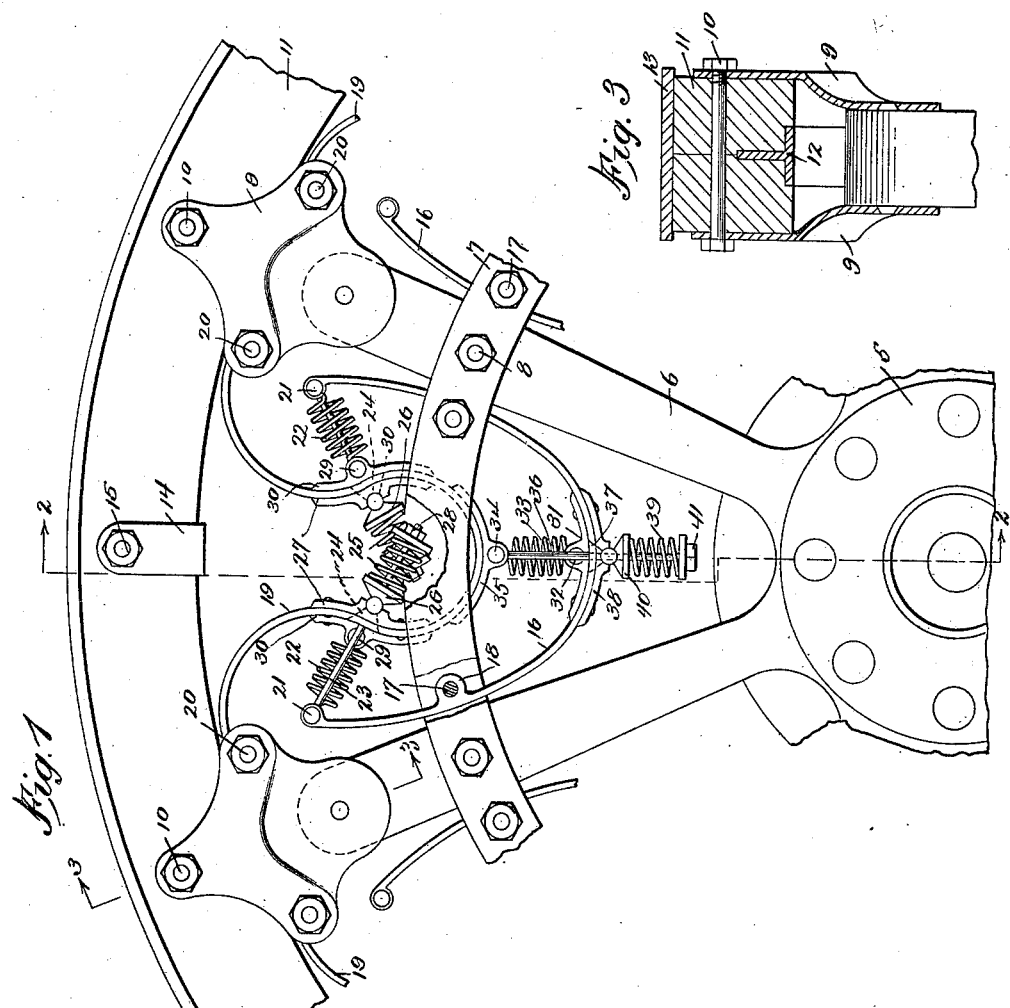
WITNESSES
F. D. Swift
B. Joff
INVENTOR
Richard Fourchy
BY Munn & Co
ATTORNEYS R. FOURCHY.
SPRING WHEEL.
APPLICATION FILED JUNE 30, 1913.
1,093,391.
Patented Apr. 14, 1914.
2 SHEETS—SHEET 2.
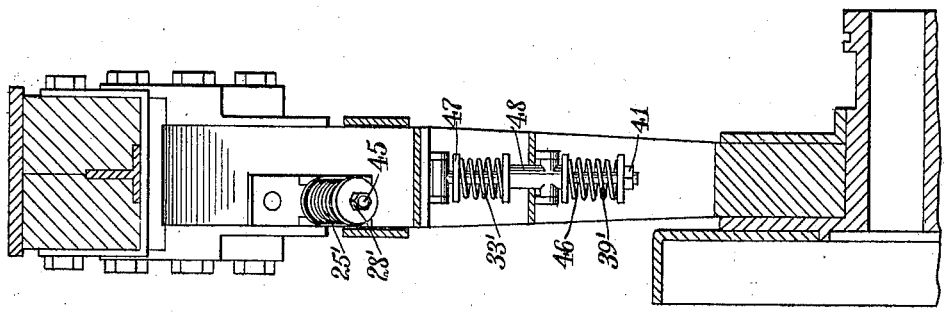
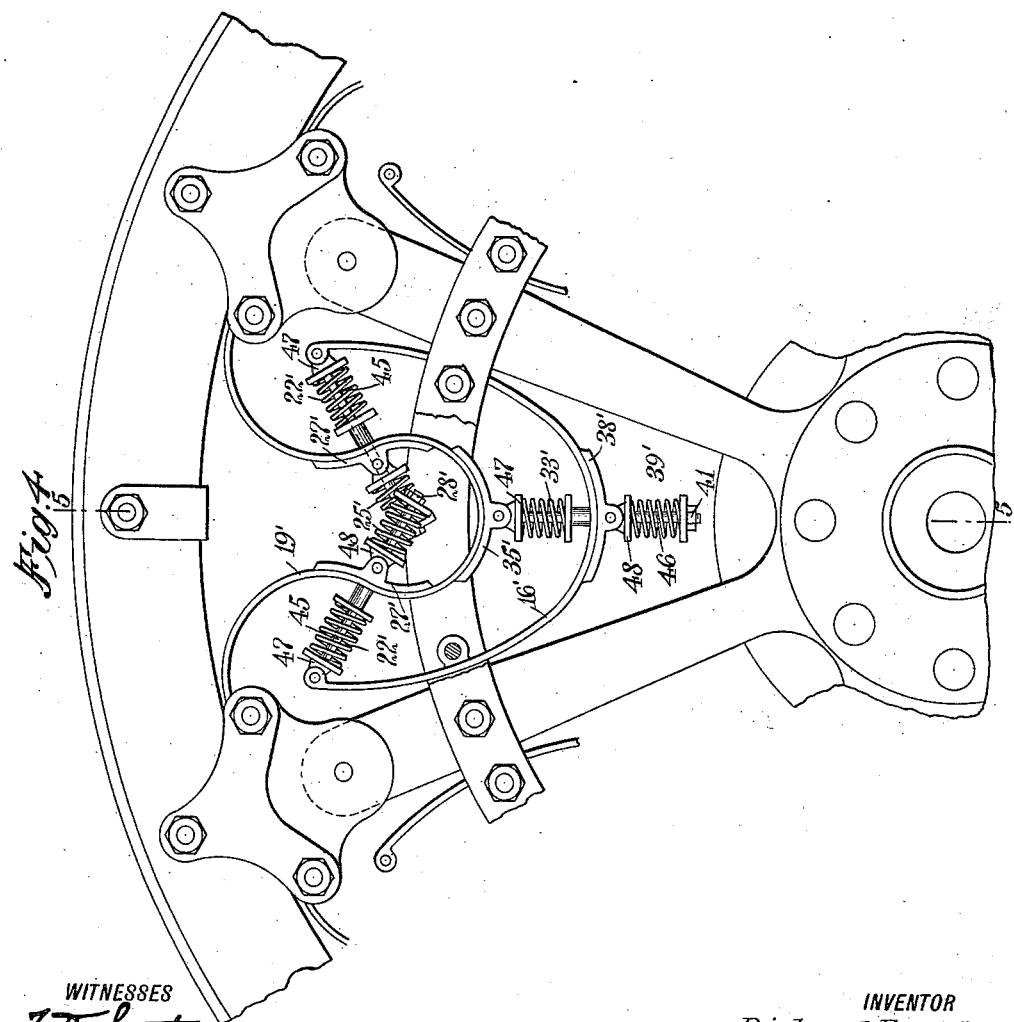
WITNESSES
INVENTOR
Richard Fourchy
BY
ATTORNEYS

UNITED STATES PATENT OFFICE.

RICHARD FOURCHY, OF KANSAS CITY, MISSOURI.

SPRING-WHEEL.

1,093,391. Specification of Letters Patent. Patented Apr. 14, 1914.

Application filed June 30, 1913. Serial No. 776,596.

*To all whom it may concern:*

Be it known that I, RICHARD FOURCHY, a citizen of the United States, and a resident of Kansas City, in the county of Jackson and State of Missouri, have invented a new and Improved Spring-Wheel, of which the following is a full, clear, and exact description.

My invention relates to spring wheels for vehicles and has reference more particularly to the resilient connection between the rim and the hub, said connection comprising a plurality of independent resilient units located between the spokes and intermediate the rim and the hub.

An object of the invention is to provide an inexpensive, strong and reliable spring wheel in which the load is evenly distributed through the body of the wheel.

The foregoing and other objects of the invention will hereinafter be more fully described and claimed and illustrated in the drawings forming a part of this specification in which like characters of reference indicate corresponding parts in all the views, and in which—

Figure 1 is a side elevation of a portion of a wheel embodying my invention; Fig. 2 is a section on the line 2—2 of Fig. 1; and Fig. 3 is a section on the line 3—3 of Fig. 1. Fig. 4 is a modified form of an embodiment of my invention; and Fig. 5 is a section on line 5—5, Fig. 4.

Referring to the drawings, 5 represents the hub between the flanges of which are rigidly secured spokes 6. Rings 7 are secured to the sides of the spokes by means of bolts 8. The rings are concentric with the hub 5 of the wheel and are at each side of the wheel. The ends of the spokes 6 are received between pairs of plates 9 which are secured by means of bolts 10 to each side of the felly 11. The plates 9 are provided with openings substantially central with the ends of the spokes 6 through which lubricant material can be admitted to the plates to diminish the friction between the ends and the plates. The end of each of the spokes 6 engaged between the plates 9 is in no way connected with the plates, and while it can move between the plates 9 in the plane of the wheel, it cannot move transversely of this plane, that is, the said end of each of the spokes is prevented from side displacement. The felly 11 is preferably formed of two similar wooden rings receiving between them a circular member 12 T-shaped in cross section, the member 12 being disposed on the inner periphery of the rings forming the felly 11. The outer periphery of the felly receives a rim 13. The rings forming the felly are connected together at different intervals by means of a straddling member 14 which receives a bolt 15 passed through it and the rings and binding the ring and member 12 together.

Positioned intermediate the adjacent spokes, the hub and the felly, are resilient units formed of flat and coil springs. One of the flat springs 16 of a unit is U-shaped having its ends directed toward the felly and itself being located between the rings 7 to which it is attached by means of bolts 17 passing through bearing portions 18 provided on each inner side of the U-member. The other flat spring 19 of the unit has the shape of two S's oppositely disposed, the ends of which are located between the plates 9 to which they are secured by means of bolts 20. The axes of the U-shaped flat spring and the oppositely disposed S-shaped spring are substantially in alinement and lie within the radius of the wheel. Each end of the flat U-shaped spring 16 is provided with an eye engaged by a pin 21. Pivotally secured to the pin 21, at one side, is a coil spring 22, and adjacent the other side is a rod 23. The rod 23 projects through an opening 24 provided in the adjacent side of the spring 19. The end of the rod 23 projecting through the spring 19 and a member 26 receives a coil spring 25 which rests on each member adapted to oscillate in a bearing 27 secured to the spring 19. The opposite end of the spring bears against a washer supported on the rod by means of a nut 28 secured to the end of the rod 23. The spring 22 has its opposite end secured to a pin 29 located in a bearing 30 secured in alinement with the bearing 27 but on the opposite side of the spring 19. The location of the spring 22 and the rod 23 on the opposite ends of the U-shaped spring 16 is staggered so as to permit the proper location of the springs 25 within the spring 19 without interference between them. The springs 22 and rods 23 are normally directed toward the center of the spring 19 formed where the two S-shapes are connected together, this center being on the radial line of the wheel.

The U-shaped spring 16 intermediate its ends is provided with a bearing portion 31 in which bears a pin 32 which receives one end of a coil spring 33, the opposite end of which is secured to a pin 34 bearing in a plate 35 secured to the central circular portion of the spring 19. The spring 33 is located toward one edge of the springs 16 and 19 so as to permit a similar arrangement between the springs 33 and a rod 36 as described between the springs 22 and the rod 23. The rod 36 is pivotally secured to the pin 34 and projects through an opening 37 provided in the spring 16, a bearing plate 38 which is secured to the spring 16 and a member 40, and on this projecting end is positioned a spring 39 bearing with one end against said member 40 bearing in the bearing plate 38 while the opposite end of the spring rests against a washer bearing contacting with a nut 41 secured to the rod 36. By means of the nuts 28 and 41 the resistance of the compression springs 25 and 39 can be varied. The springs 33 and 39 are in alinement and are substantially in the radial line of the wheel.

The coil springs are so distributed between the springs 16 and 19 that the angle between them is substantially the same and is 120 degrees. The springs 22 and 25, as well as 33 and 39, are acting in opposition to each other. They are set to a compression equal to about half their capacity, and the total compression of all the springs 22 and 33 is substantially equal to the normal load on the wheel, and similarly the total compression on all the springs 25 and 39. The result is that under normal load on the wheel, the felly and the hub are concentric and are in perfect and steady balance as related to each other. Any shock in the line of traction applied to the felly, the hub or the spokes, whether vertical, horizontal or concentric, such, for instance, as the transmission of power from the hub to the felly or sudden loading, the unevenness of the road, or any such shock or shocks, will tend to disturb the concentricity of the felly with the hub, and in doing so causes the springs 22, 33, 25 and 39 to get into action and resist that tendency as follows: At the moment of the shock the compression of each of the springs 22 and 33 is opposed by nearly an equal compression by the springs 25 and 39. As the shock passes between the felly and the hub, this equality of compression is disturbed, and in consequence compression is increased on three of the coil springs in each of the units, and correspondingly diminishes the resistance of the three complementary coil springs in each of the said units. The loss of compression by said complementary springs is an equivalent gain for the three other companion springs. The result is that the resistance of the shock offered by those springs which receive it is gradual but quickly accelerated until ultimate resistance has been reached. The three companion springs which are relaxed from their normal compression will immediately return to their normal position when the shock has passed, and will restore the felly and hub to its normal relation, thereby establishing the balance of the wheel. The springs 16 and 19 add to receive and disseminate extreme shocks which may exceed the maximum resistance of the coil springs; also the flat springs add to the resiliency and elasticity of the units and help to maintain the hub and the felly in the same plane.

In a modified form, as shown in Figs. 4 and 5, the mutually opposing compression springs 22' and 25' are mounted on a rod 45, and the mutually opposed compression springs 33' and 39' are mounted on a rod 46. The rod 45 is provided with a flanged head 47 pivotally connected to the end of the flat spring 16' with the other end projecting through a member 48 pivotally mounted in a bearing 27' secured to the flat spring 19'. This member 48 has a portion projecting through the said bearing and flat spring 19' and has a flanged portion on this projecting portion, the spring 22' being compressed between the flanged head 47 of the rod 45 and the flanged portion of the member 48. The end of the rod 45 lying within the flat spring 19' receives the spring 25', the tension of which is controlled by means of the nut 28'. The rod 46 is similarly provided with a flanged head 47 pivotally mounted in a bearing block 35' secured to the flat spring 19'. The rod 46 projects also through a member 48 pivotally mounted in a bearing block 38' secured to the flat spring 16'. The end of the rod 46 lying outside the flat spring 19' receives a coil spring 39', the tension of which is controlled by means of a nut 41'. The rods 45 connected to the opposite ends of the flat springs 16' are at opposite sides of the flat spring 16', so as to prevent interference between the springs 25' positioned on said rods within the flat spring 19'. The rod 46 pivotally connected to the flat spring 19' is lying substantially in the central plane of the wheel, as can be seen from Fig. 5. With the position of the springs as shown in the modified form, the stresses between the facing mutually opposite compression springs are more evenly distributed, particularly by the provision of the rod 46 in the central plane of the wheel.

Having thus described my invention, I claim as new and desire to secure by Letters Patent:—

1. In a spring wheel, a hub, a felly, spokes from the hub to the felly, and resilient units intermediate the hub, the spokes and the felly, each of the resilient units comprising a spring having the shape of two oppositely disposed S's engaging the felly, a U-shaped spring engaging the adjacent spokes, and compression springs connecting said U-shaped spring with the S-shaped springs, substantially as set forth.

2. In a spring wheel, a hub, a felly, spokes rigidly secured to the hub and extending to the felly, means pivotally attached to the felly engaging the spokes, and resilient units intermediate the hub, spokes and felly, each comprising a spring having the shape of oppositely disposed S's, the ends of which are secured to said means, a U-shaped spring secured to the adjacent spokes, and compression springs connecting the U-shaped and S-shaped springs, substantially as set forth.

3. In a spring wheel, a hub; spokes rigidly secured to the hub; a felly; means on the felly engaging the spokes, and whereby the hub with the spokes can only move in the plane of the wheel, and resilient units intermediate the hub spokes and felly, each comprising a spring between the adjacent spokes connected to the felly; a second spring connected to the adjacent spokes; and compression springs connecting the two springs, substantially as and for the purpose set forth.

4. In a spring wheel, a hub, a felly, spokes rigidly secured to the hub and extending to the felly, means pivotally attached to the felly engaging the spokes, and resilient units intermediate the hub, spokes and felly, each unit comprising a flat spring having the shape of oppositely disposed S's, the ends of which are pivotally secured to said means, a flat U-shaped spring secured to the adjacent spokes, and pairs of mutually opposing compression springs normally balancing each other connecting said flat springs, substantially as set forth.

5. In a spring wheel, a hub, a felly, spokes rigidly secured to the hub and extending to the felly, means on the felly engaging the spokes, and resilient units intermediate the hub, spokes and felly, each unit comprising a flat spring having the shape of oppositely disposed S's, the ends of which are secured to the means on the fellies, a U-shaped flat spring secured to the adjacent spokes, the major part of said oppositely disposed S-shaped spring being located within the U-shaped spring, pairs of balanced compression springs positioned on both sides of the oppositely disposed S-shaped spring and connected to the extremities of said U-shaped spring, and another pair of balanced compression springs positioned at each side of the central portion of the U-shaped spring and connecting it to the S-shaped spring, substantially as set forth.

6. In a spring wheel, a hub, a felly, spokes secured to the hub and extending to the felly, means on the felly engaging the spokes, resilient means intermediate the hub, spokes and felly, each unit comprising a flat spring having the shape of oppositely disposed S's, the ends of which are secured to the means on the felly, a U-shaped flat spring secured to the adjacent spokes, the major part of said oppositely disposed S-shaped springs being located within the U-shaped spring, pairs of facing mutually opposing compression springs positioned on both sides of the oppositely disposed S-shaped springs and connected to the extremities of said U-shaped spring, and another pair of facing balanced mutually opposing compression springs positioned at each side of the central portion of the U-shaped spring and connected to the S-shaped spring, substantially as set forth.

In testimony whereof I have signed my name to this specification in the presence of two subscribing witnesses.

RICHARD FOURCHY.

Witnesses:
KELLY BRENT.
LOUIS J. BENNETT.

Copies of this patent may be obtained for five cents each, by addressing the "Commissioner of Patents, Washington, D. C."